United States Patent [19]

Moisdon

[11] 3,735,839
[45] May 29, 1973

[54] GRAVITY MOTOR

[76] Inventor: Roger Francois Moisdon, 4875 S.W. 28th Ave., Fort Lauderdale, Fla. 33312

[22] Filed: Apr. 28, 1971

[21] Appl. No.: 81,446

[30] Foreign Application Priority Data

Oct. 16, 1969 France..........................6935395

[52] U.S. Cl..........................185/29, 185/30, 185/39, 60/22, 417/328, 417/337
[51] Int. Cl................................................F03g 3/00
[58] Field of Search..................185/29, 30, 33, 39; 60/7 A, 7 R, 9, 10, 22; 417/328, 329, 330, 337

[56] References Cited

UNITED STATES PATENTS

| 1,446,697 | 2/1923 | Franklin | 60/22 |
| 1,682,176 | 8/1928 | Hegenbarth | 185/30 |
| 1,853,637 | 4/1932 | Reiner | 185/29 X |

Primary Examiner—Edgar W. Geoghegan
Attorney—John H. Oltman

[57] ABSTRACT

A gravity motor having a vacuum body has a plurality of units each comprising an unbalanced weight and mechanical gear box, either direction of rotation of a reversible shaft being used to tighten mechanical energy accumulating means coupled to the shaft of said motor for subsequent release to rotate said shaft as an output shaft upon operation of manual actuating means, a flywheel being used as a rotation regulator.

5 Claims, 8 Drawing Figures

PATENTED MAY 29 1973 3,735,839
SHEET 1 OF 2
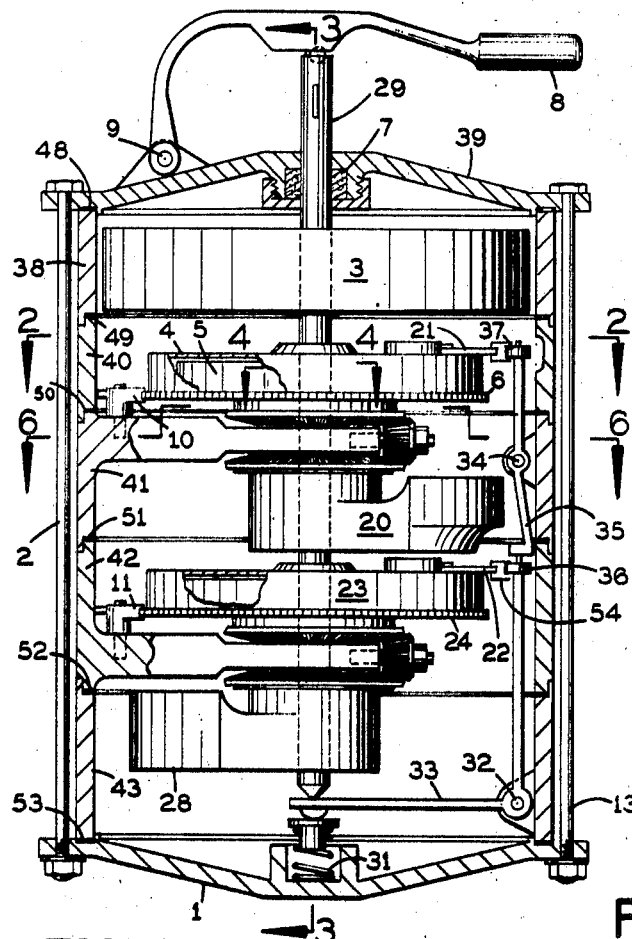
FIG. 1
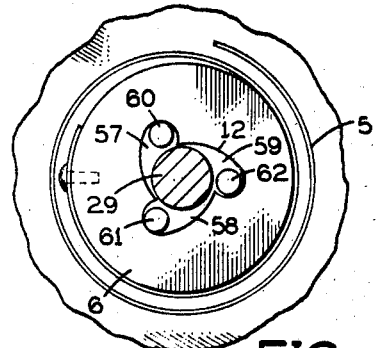
FIG. 4
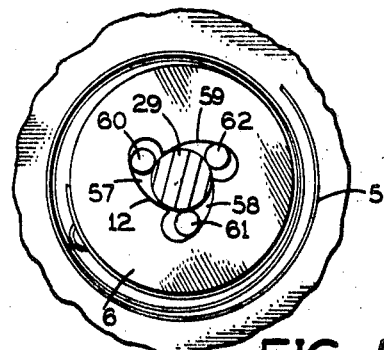
FIG. 5
FIG. 2
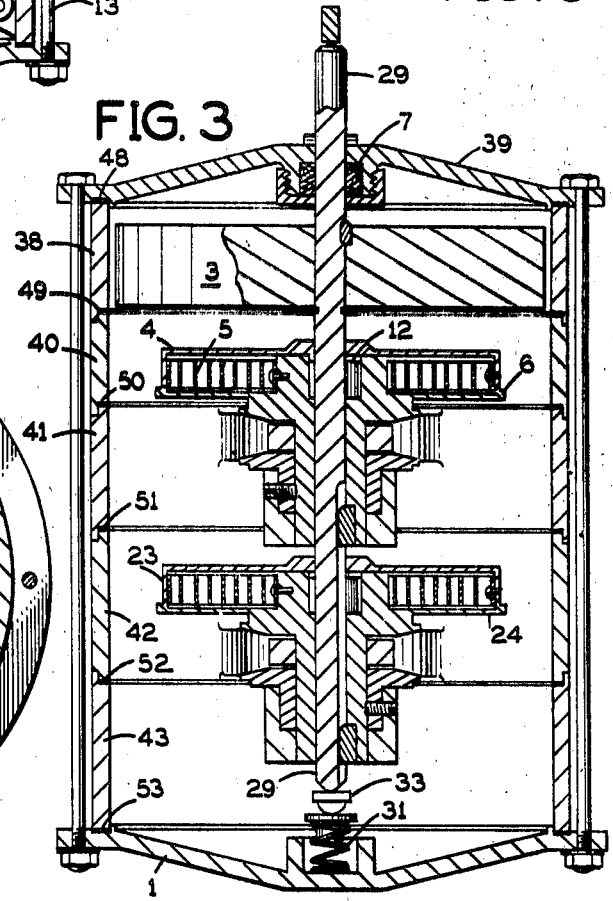
FIG. 3

PATENTED MAY 29 1973

GRAVITY MOTOR

This invention relates generally to a gravity motor; it is directed particularly to a novel gravity motor comprised of several vacuum power units storing their energy and supplying it at adequate times on a flywheeled shaft.

At the present time, gravity motors can be divided generally into two classes, viz., those that are stable as an ordinary clock motor, and those that are operating by motion as the waving gravity motor used in boats. Of these two classes the second is related to the present invention and presently has many deficiencies as poor sensitiveness, poor regularity and weak torque. They cannot be used for replacing electric motors, their potential power being low and their mechanism being open to air and destroyed by the dampness.

It is accordingly, the principal object of this invention to obviate the above described deficiencies of a gravity motor and provide a novel gravity motor having several vacuum power units which are built into a body housing two unbalanced weights swinging around inside the said body and contributing together to actuate an energy accumulating device. All these devices operate in vacuum conditions, the said body being sealed by welding or by a gasket.

For more simplicity, in the following description the accumulative device and the unbalanced weight will be called a "unit."

This invention provides a very sensitive gravity motor which provides high power, great torque and regular work.

In this connection it will be understood that unbalanced weights have much more power to actuate accumulative devices because they are working in vacuum conditions so no air can break their swinging. Equally important, the vertical position of the master weight's axle provides much more sensitivity.

Maintenance of this gravity motor has been simplified, since the motor is completely sealed. The mechanism is never in contact with moisture or humidity, providing high working security.

Another object is to provide a gravity motor of the character described which, because of its vacuum conditions, is capable of great power.

Yet another object is to provide a gravity motor of the character described wherein the winding of the spring accumulating device is done by a two way automatic clutch using one way direct clutching and the other way reverse gear clutching providing winding work for each direction of motion of the unbalanced weight.

Still another object is to provide a gravity motor including an accumulating power device using a spring wound tight between two wheels and automaticaly clutched on the main shaft providing a smooth and regular torque keeping the said main shaft rotating at average speed.

Yet another object is to provide a gravity motor of the character described having a heavy flywheel regularizing its rotative power.

Other objects features and advantages of this invention will be apparent from the following description when read with reference to the accompanying drawings.

In the drawings, wherein like reference numerals denote corresponding parts throughout the several views:

FIG. 1 is an elevational cross-sectional view of a gravity motor embodying the invention.

FIG. 2 is a top sectional view of an accumulative device.

FIG. 3 is a sectional view on lines 3—3 of FIG. 1.

FIGS. 4 and 5 are sectional view on lines 4—4 of FIG. 1.

Figure 7:
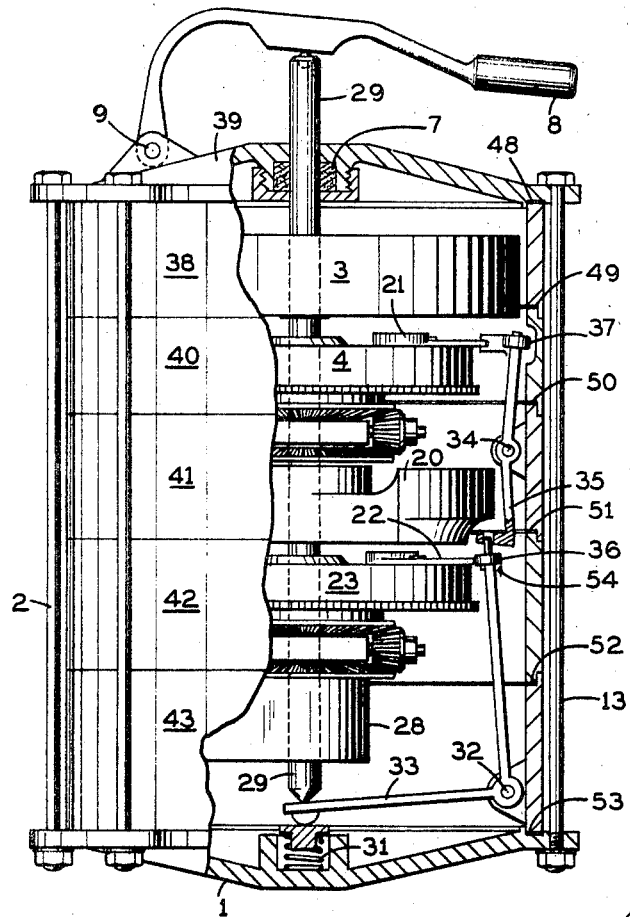
FIG. 7 is an elevational view similar to FIG. 1, but with the unit being powered by a spring in the lower wheel 23.
Figure 6:
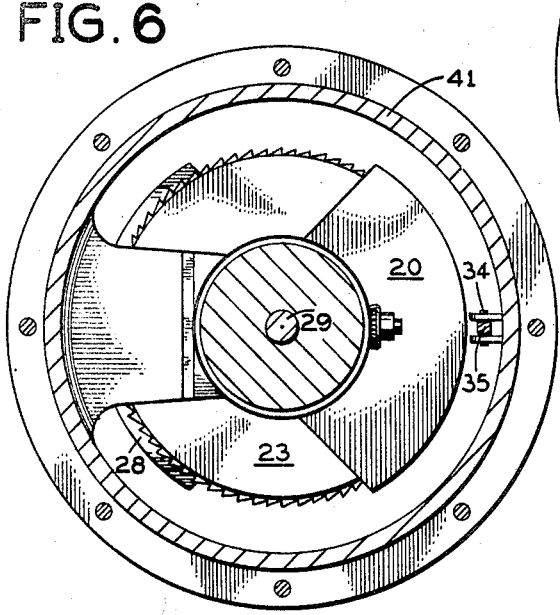
FIG. 6 is a sectional view on lines 6—6 of FIG. 1.
Figure 8:
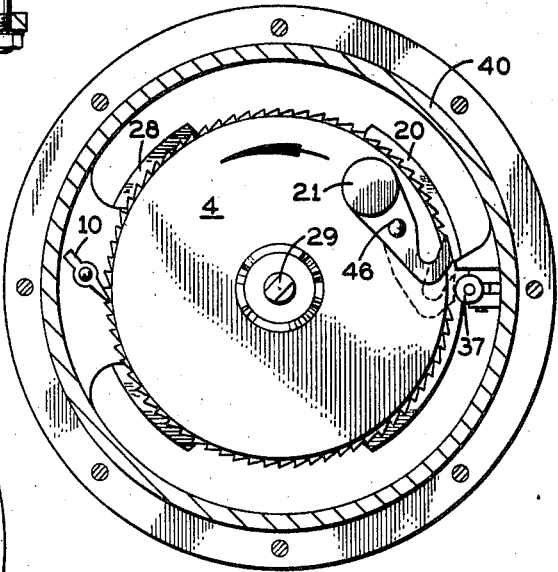
FIG. 8 is a sectional view showing the unit being powered by a spring within upper wheel 4.

Referring now in detail to the drawing, a gravity motor embodying the invention is shown comprising generally a housing 1 preferably constituted by several annular casings 38, 40, 41, 42, 43, with gaskets 48, 49, 50, 51, 52, 53. There are two unbalanced weights 20, 28, a flywheel 3 and two power storage devices comprising the parts 4, 5, 6, 10, 23, 24, 11, 21, 37, 34, 35, 36, 22, 32, 33, these two automatic devices controlling the work of this motor.

As illustrated on FIG.1 the rotating seal 7 keeps the atmospheric pressure outside and allows the passage of the shaft 29.

Still as illustrated in FIG.1 the gravity motor's body 1 is built in the shape to resist the atmospheric pressure and for this purpose the top and the bottom are conically shaped and the body's wall is cylindrical and its parts are pulled together by threaded rods 2 and 13.

The rocking motion of this gravity motor 1 puts the unbalanced weights 20 and 28 in motion, which tightens the springs 5 till both springs are fully tightened. At this time the gravity motor is ready to work. When power is needed the lever88 is moved towards the motor's body 1. The shaft 29 pushes the lever 33 and compresses the spring 31. The lever 33 being fulcrumed at the pivot 32, pushes the centrifugal lock 22 pivots on the body at point 54. These actions let the wheel 23 rotate and the inside spring 5 unwinds. The said wheel 23 is connected to the main shaft through its automatic clutch 12. The wheel 23 gains speed, and the lock 22 comes toward the center of the wheel 23. When the spring is unwound completely, the automatic clutch of wheel 23 unclutches the shaft 29 which is now rotating with its operatively interconnected flywheel 3. Therefore the wheel 23 stops, and its centrifugal lock 22 moves out of the center, being not centrally attracted by the centrifugal action in the very last turn, and strikes the body's point 54. But at this time the said centrfugal lock 22 pushes the wheel 36 outward which is rotating at the outer end of a rocker arm 35 centrally fulcrumed at pivot point 34, the said rocker arm 35 having another wheel 37 rotating at its other end and always in contact with the centrifugal lock21 affixed on the wheel 4. As a result, when the first accumulating wheel unit is spent, the operation is transmitted to the other centrifugal lock 21 which releases the spring 5 allowing wheel 4 to apply its accumulated power on the main shaft 29 through its automatic clutch 12. It will be understood that the same process is used to transmit the starting order from the lock 21 to the lock 22, the two units transmitting the starting action to each other.

As illustrated in FIGS. 1 and 2, the accumulating device 4 has a spiral spring 5 inside, secured at each end by rivets, one on the wheel 4, the other one on the wheel 6, those two wheels 4 and 6 forming a housing for the said spring 5.

As illustrated in FIG.2 the automatic clutch 12 is constitued by three rollers 60, 61, 62, rotating between the shaft 29 and their three wedge surfaces 57, 58, 59, housing them.

It is contemplated that because of the special shape of the said wedge surfaces 57, 58, 59, the said rollers 60, 61, 62, are free to roll between the shaft 29 and the wheel 4 each time the shaft 29 is leading, but they are wedged between the both of them each time the wheel 4 is leading, thereby constituting the automatic clutch.

As illustrated in FIG.2, the centrifugal lock 21 is centrally fulcrumed on the pivot 46 having an hooked outward end and a weighty inward end. The output shaft is shaft 29.

While I have illustrated and described herein only the form in which the invention can conveniently be embodied in practice, it is to be understood that this form is presented by way of example only, and not in a limiting sense.

The invention, in brief, comprises all the modifications and embodiments coming within the scope and spirit of the following claims.

What I claim as new and desire to secure by Letters Patent is:

1. In a gravity motor, the combination comprising a housing, power accumulating devices in said housing having automatic clutches and centrifugal locks, unbalanced weights working reversibly to drive said accumulating devices, a flywheel driven by said accumulating devices, and a control for starting the operation of said accumulating devices.

2. A gravity motor as defined in claim 1 wherein the inside of said housing is in vacuum condition.

3. A gravity motor as defined in claim 1 wherein the unbalanced weights are connected to a vertical shaft connected to said flywheel.

4. A gravity motor as defined in claim 1 wherein said control includes a rocker arm connected to said centrifugal lock.

5. A gravity motor as defined in claim 1 wherein said flywheel regularizes the motor's rotation.

* * * * *